US010701042B2

United States Patent
Thakurta et al.

(10) Patent No.: US 10,701,042 B2
(45) Date of Patent: Jun. 30, 2020

(54) LEARNING NEW WORDS

(71) Applicant: Apple Inc., Cupertino, CA (US)

(72) Inventors: Abhradeep Guha Thakurta, Santa Cruz, CA (US); Andrew H. Vyrros, San Francisco, CA (US); Umesh S. Vaishampayan, Santa Clara, CA (US); Gaurav Kapoor, Santa Clara, CA (US); Julien Freudiger, San Francisco, CA (US); Vivek Rangarajan Sridhar, Sunnyvale, CA (US); Doug Davidson, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 76 days.

(21) Appl. No.: 16/159,473

(22) Filed: Oct. 12, 2018

(65) Prior Publication Data

US 2019/0097978 A1  Mar. 28, 2019

Related U.S. Application Data

(63) Continuation of application No. 15/477,921, filed on Apr. 3, 2017, now Pat. No. 10,133,725, which is a (Continued)

(51) Int. Cl.
*H04L 29/06* (2006.01)
*G06N 20/00* (2019.01)
(Continued)

(52) U.S. Cl.
CPC .......... *H04L 63/0428* (2013.01); *G06F 7/588* (2013.01); *G06F 9/30029* (2013.01);
(Continued)

(58) Field of Classification Search
CPC .................................................. H04L 63/0428
See application file for complete search history.

(56) References Cited

U.S. PATENT DOCUMENTS 8,140,332 B2   3/2012   Itoh et al.
8,185,376 B2   5/2012   Chu et al.
(Continued)

OTHER PUBLICATIONS

Chen, Rui, Gergely Acs, and Claude Castelluccia. "Differentially private sequential data publication via variable-length n-grams." Proceedings of the 2012 ACM conference on Computer and communications security. 2012. (Year: 2012).*

(Continued)

*Primary Examiner* — Shaun Roberts
(74) *Attorney, Agent, or Firm* — Jaffery Watson Mendonsa & Hamilton LLP

(57) ABSTRACT

Systems and methods are disclosed for a server learning new words generated by user client devices in a crowdsourced manner while maintaining local differential privacy of client devices. A client device can determine that a word typed on the client device is a new word that is not contained in a dictionary or asset catalog on the client device. New words can be grouped in classifications such as entertainment, health, finance, etc. A differential privacy system on the client device can comprise a privacy budget for each classification of new words. If there is privacy budget available for the classification, then one or more new terms in a classification can be sent to new term learning server, and the privacy budget for the classification reduced. The privacy budget can be periodically replenished.

18 Claims, 11 Drawing Sheets

Related U.S. Application Data continuation of application No. 15/275,357, filed on Sep. 24, 2016, now Pat. No. 9,645,998.

(60) Provisional application No. 62/371,657, filed on Aug. 5, 2016, provisional application No. 62/348,988, filed on Jun. 12, 2016.

(51) Int. Cl.
| | |
|---|---|
| *G06F 16/36* | (2019.01) |
| *G06N 3/12* | (2006.01) |
| *G06F 40/205* | (2020.01) |
| *G06F 40/242* | (2020.01) |
| *G06F 40/279* | (2020.01) |
| *G06F 40/284* | (2020.01) |
| *G06F 17/16* | (2006.01) |
| *G06F 16/35* | (2019.01) |
| *G06F 7/58* | (2006.01) |
| *G06F 9/30* | (2018.01) |

(52) U.S. Cl.
CPC .......... *G06F 16/353* (2019.01); *G06F 16/374* (2019.01); *G06F 17/16* (2013.01); *G06F 40/205* (2020.01); *G06F 40/242* (2020.01); *G06F 40/279* (2020.01); *G06F 40/284* (2020.01); *G06N 3/126* (2013.01); *G06N 20/00* (2019.01)

(56) References Cited

U.S. PATENT DOCUMENTS

| | | | |
|---|---|---|---|
| 9,386,037 | B1 | 7/2016 | Hunt |
| 2003/0053622 | A1 | 3/2003 | Bruen et al. |
| 2005/0256715 | A1 | 11/2005 | Okimoto et al. |
| 2009/0031175 | A1 | 1/2009 | Aggarwal et al. |
| 2009/0157740 | A1 | 6/2009 | Barley et al. |
| 2009/0254817 | A1 | 10/2009 | Dreyfus et al. |
| 2011/0064221 | A1 | 3/2011 | McSherry et al. |
| 2011/0208763 | A1 | 8/2011 | McSherry et al. |
| 2012/0143922 | A1 | 6/2012 | Rane et al. |
| 2012/0204026 | A1 | 8/2012 | Shi et al. |
| 2012/0296898 | A1 | 11/2012 | Cormode et al. |
| 2012/0316956 | A1 | 12/2012 | Nath et al. |
| 2013/0036459 | A1 | 2/2013 | Liberman et al. |
| 2013/0145473 | A1 | 6/2013 | Cormode et al. |
| 2013/0212690 | A1 | 8/2013 | Farwaz et al. |
| 2014/0196151 | A1 | 7/2014 | Mishra et al. |
| 2014/0278357 | A1 | 9/2014 | Horton |
| 2014/0281572 | A1 | 9/2014 | Wang et al. |
| 2014/0283091 | A1 | 9/2014 | Zhang et al. |
| 2015/0293923 | A1 | 10/2015 | Eide et al. |
| 2015/0339493 | A1 | 11/2015 | Ioannidis et al. |
| 2015/0371059 | A1 | 12/2015 | Bilogrevic et al. |
| 2016/0071170 | A1 | 3/2016 | Massoulie et al. |
| 2016/0203333 | A1 | 7/2016 | Fawaz et al. |

OTHER PUBLICATIONS

PCT International Preliminary Report on Patentability for PCT International Application No. PCT/US2017/036576, dated Dec. 27, 2018, 10 pgs.

Roy, S. Setty, A. Kilzer, V. Shmatikov, E. Witchel. "Airavat: Security and Privacy for MapReduce." NSDI, 2010.

Cynthia Dwork and Aaron Roth. "The Algorithmic Foundations of Differential Privacy." Foundations and Trends in Theoretical Computer Science, vol. 9, Nos. 3-4, Aug. 2014.

Chao Li and Gerome Miklau. "An Adaptive Mechanism for Accurate Query Answering under Differential Privacy." Proc. VLDB Endowment, pp. 514-525, Feb. 2012.

Fanti, G., Pihur, V. And Erlingsson, LI. "Building a RAPPOR with the Unknown: Privacy-Preserving Learning of Associations and Data Dictionaries." Proceedings on Privacy Enhancing Technologies. vol. 2016, Issue 3, pp. 11-61.

Dwork, C., McSherry, F., Nissim, K., Smith, A. "Calibrating Noise to Sensitivity in Private Data Analysis." Theory of; ryptography. TCC 2006. Lecture Notes in Computer Science, vol. 3876. Springer, Berlin, Heidelberg.

Vadhan, Salil. "The Complexity of Differential Privacy." Center for Research on Computation & Society John A. Paulson School of Engineering & Applied Sciences Harvard University, Aug. 9, 2016.

Chaudhuri, S., Kaushik, R. and Ramamurthy, R. "Database Access Control & Privacy: Is There A Common Ground?" In: Proceedings of CIDR 2011, pp. 96-103 (2011 ).

Liu, C., Chakraborty, S. and Mittal, P. "Dependence makes you Vulnerable: Differential Privacy under Dependent Tuples." NOSS '16, Feb. 21-24, 2016.

Ding, B., Winslett, M., Han, J., & Li, Z. "Differentially Private Data Cubes: Optimizing Noise Sources and Consistency." In Proceedings of SIGMOD 2011 and PODS 2011,2011, pp. 217-228.

Mohammed, N., Chen, R., Fung, B., and Yu, P. "Differentially Private Data Release for Data Mining." KDD'11, Aug. 21-24, 2011, pp. 493-501.

J. Hsu, M. Gaboardi, A. Haeberl en, S. Khanna, A. Narayan, B.C. Pierce, and A. Roth. "Differential Privacy: An Economic Method for Choosing Epsilon." Proc. of CSF 2014.

Ebadi, H., Sands, D. Schneider, G. "Differential Privacy: Now it's Gelling Personal." In: POPL 2015, ACM, 2015, pp. 59-81.

Kueyang Hu, et al. "Differential Privacy in Telco Big Data Platform." Proceedings of the VLDB Endowment, 8(12): 1692-1703, 2015.

Alvin, M.S., et al. "Differential Privacy: On The Trade—Off between Utility and Information Leakage." Proceedings of the 8th International Workshop on Formal Aspects of Security & Trust (FAST11 ), Springer, LNCS 7140, 2011.

Haeberlen, Andreas, et al. "Differential Privacy Under Fire." In USENIX'11, 2011.

Narayan, Arjun. "Distributed Differential Privacy and Applications." Presented to the Faculties of the University of Pennsylvania, 2015.

Ning Zhang, Ming Li, and Wenjing Lou. "Distributed Data Mining with Differential Privacy." In IEEE International :; Conference on Communications, 2011.

Narayan, Arjun Ravi, "Distributed Differential Privacy and Applications." Publicly Accessible Penn Dissertations, Jan. 1, 2015.

Hamid Ebadi and David Sands. "Featherweight PINO." CoRR, 2015.

Mohan, Prashanth. "GUPT: Privacy Preserving Data Analysis made Easy," Proceedings of the 2012 ACM SIGMOD International Conference on Management of Data, May 20-24, 2012.

Ikkus, I. et al. "Non-tracking Web Analytics." CCS'12, ACM, Oct. 16-18, 2012.

Lee, Sangmin, et al. "[pi]box: A Platform for Privacy-Preserving Apps." In 1 0th USENIX Symposium on Networked Systems Design and Implementation (NSDI '13),2013.

R. A. Popa, et al. "Privacy and Accountability for Location-based Aggregate Statistics." In Proceedings of the 18th ACM Conference on Computer and Communications Security, Oct. 17-21, 2011.

Kandappu, Thivya, et al. "Privacy in Crowdsourced Platforms." Springer International Publishing: Privacy in a Digital, Networked Wo?d. 2015, pp. 57-84.

Apple Inc. IOS Security Guide—Mar. 2017.

J. M. Abowd. The Challenge of Scientific Reproducibility and Privacy Protection for Statistical Agen- cies. https://www2.census.gov/cac/sac/meetings/2016-09/2016-abowd.pdf, Sep. 15, 2016. Census Scientific Advisory Committee.

R. Bassily and A. Smith. Local, Private, Efficient Protocols for Succinct Histograms. In STOC, 2015.

G. Cormode and S. Muthukrishnan. An improved data stream summary: The count-min sketch and its applications. J. Algorithms, 55(1):58-75, Apr. 2005.

J. C. Ouchi, M. Jordan, M. J. Wainwright, et al. Local Privacy and Statistical Minimax Rates. In FOCS. IEEE, 2013.

C. Dwork, M. Naor, T. Pitassi, and G. N. Rothblum. Differential privacy under continual observation. In Proceedings of 30 the

(56) References Cited

OTHER PUBLICATIONS

Forty-second ACM Symposium on Theory of Computing, STOC '10, pp. 715-724, New York, NY, USA, 2010.
U. Erlingsson, V. Pihur, and A. Korolova. RAPPOR: Randomized Aggregatable Privacy-Preserving Ordinal Response. In ACM CCS, 2014.
M.Gaboardi,J.Honaker,G.King,K.Nissim,J.Ullman,S.Vadhan,andJ. Murtagh.PSI(IJJ):a Private data Sharing Interface. In Theory and Practice of Differential Privacy, 2016.
J. Hsu, S. Khanna, and A. Roth. Distributed Private Heavy Hitters. In ICALP. 2012.
S. P. Kasiviswanathan, H. K. Lee, K. Nissim, S. Raskhodnikova, and A. Smith. What Can We Learn Privately? SIAM Journal on Computing, 40(3):793-826, 2011.
A. Machanavajjhala, D. Kifer, J. Abowd, J. Gehrke, and L. Vilhuber. Privacy: Theory Meets Practice on the Map. In 35 Proceedings of the 2008 IEEE 24th International Conference on Data Engineering, ICDE '08, pp. 277-286, Washington, DC, USA, 2008. IEEE Computer Society.
F. D. Mcsherry. Privacy integrated queries: An extensible platform for privacy-preserving data anal- ysis. In 36 Proceedings of the 2009 ACM SIGMOD International Conference on Management of Data, SIGMOD '09, pp. 19-30, New York, NY, USA, 2009. ACM.
N. Mishra and M. Sandler. Privacy via Pseudorandom Sketches. In PODS, 2006.
Z. Qin, Y. Yang, T. Yu, I. Khalil, X. Xiao, and K. Ren. Heavy hitter estimation over set-valued data with local differential 38 privacy. In Proceedings of the 2016 ACM SIGSAC Conference on Computer and Communications Security, CCS 16, pp. 192-203, New York, NY, USA, 2016. ACM.

\* cited by examiner

LEARNING NEW WORDS

RELATED APPLICATIONS

This application is a continuation of co-pending U.S. patent application Ser. No. 15/477,921, filed Apr. 3, 2017, which claims priority to U.S. patent application Ser. No. 15/275,357, filed Sep. 24, 2016, and entitled, "LEARNING NEW WORDS," (issued as U.S. Pat. No. 9,645,998 on May 9, 2017) which claims priority to U.S. Patent Application No. 62/348,988, filed Jun. 12, 2016, and entitled, "LEARNING NEW WORDS," and U.S. Patent Application No. 62/371,657, filed Aug. 5, 2016, entitled "LEARNING NEW WORDS," of which are incorporated herein by reference to the extent that they are consistent with this disclosure.

This application is related to U.S. patent application Ser. No. 15/275,356, filed Sep. 24, 2016, now issued as U.S. Pat. No. 9,594,741 and entitled "LEARNING NEW WORDS," which is incorporated herein by reference to the extent that is it consistent with this disclosure.

TECHNICAL FIELD

This disclosure relates to the field of a server learning new words generated on a client device.

BACKGROUND

A user of a client device relies on one or more dictionaries of words for spell checking, suggesting words during typing, and other uses of known words. Such client dictionaries are difficult to keep updated with new words that may become popular through crowdsourced usage of words without compromising privacy.

Current servers can learn the words that users are typing by examining clear text that users have typed when utilizing the servers. For example, some prior art text message services and email services (collectively, messages) receive messages in clear text. Message servers that route messages to client devices can read the clear text and use the words obtained from the clear text of user messages to present advertising to the users. However, the server-learned words remain on the server and do not update an on-device dictionary to include the new words. Also, usage of clear text by servers compromises the privacy of a user. In addition, new words generated on a client device, such as words that are used within documents on the client device and are not transmitted to a server, cannot be learned by the server because the words are localized to the client device. Further, if the client device utilizes an end-to-end encrypted messaging service, such as Apple® iMessage, then a server cannot learn the words contained in the user message at all and thus a server cannot update a user client dictionary using crowdsourced data.

SUMMARY OF THE DESCRIPTION

Systems and methods are disclosed for a server learning new words generated by user client devices in a crowdsourced manner while maintaining local differential privacy of client devices. In a crowdsourced, client/server environment, local differential privacy introduces randomness into user data prior to a client sharing the user data with a server. A server can learn from the aggregation of the crowdsourced data of all clients, but the server cannot learn the data provided by any particular client.

Local differential privacy introduces, in one embodiment, randomness to client user data prior to sharing the user data. Instead of having a centralized data source $D=\{d1, \ldots, dn\}$, each data entry $d_i$ belongs to a separate client i. Given the transcript $T_i$ of the interaction with client i, it is not possible for an adversary to distinguish $T_i$ from the transcript that would have been generated if the data element were to be replaced by null. The degree of indistinguishability is parameterized by $\varepsilon$, typically considered to be a small constant. The following is a formal definition of local differential privacy.

Let n be the number of clients in a client-server system, let $\Gamma$ be the set of all possible transcripts generated from any single client-server interaction, and let $T_i$ be the transcript generated by a differential privacy algorithm A while interacting with client i. Let $d_i \in S$ be the data element for client i. Algorithm A is $\varepsilon$-locally differentially private if, for all subsets $T \subseteq \Gamma$, the following holds:

$$\forall\, i \in [n],\, d \in S \left| \ln \frac{Pr[Ti \in \Gamma \mid di = d]}{PR\,[Ti \in \Gamma \mid di = \text{null}]} \right| \leq \varepsilon.$$

Here, $d_i$=null refers to the case where the data element for client i is removed.

The systems and methods disclosed herein include an $\varepsilon$-local differentially private count-median-sketch (CMS) and a Hadamard $\varepsilon$-local differentially private count-median-sketch (CMS) that compare favorably to prior art methods, with respect to error, communication load, space used, and client and server computation, while preserving user privacy, as shown in the table below.

|  | Error | Communication | Space | Client Computation | Server Computation |
|---|---|---|---|---|---|
| Applicant's CMS | $\Theta\left(\frac{1}{\sqrt{n}}\right)$ | $O(\sqrt{n})$ | $O(\sqrt{n})$ | $O(\sqrt{n})$ | $O(\sqrt{n})$ |
| Applicant's Hadamard CMS | $\Theta\left(\frac{1}{\sqrt{n}}\right)$ | $O(1)$ | $O(\sqrt{n})$ | $O(\log n)$ | $O(\sqrt{n})$ |
| Prior art (Bassily & Smith) | $\Theta\left(\frac{1}{\sqrt{n}}\right)$ | $O(1)$ | $O(n)$ | $O(\log n)$ | $O(n)$ |
| Prior art (Hsu, Khanna, Roth) | $O\left(\frac{1}{n^{\frac{1}{6}}}\right)$ | $O(n)$ | $O(n)$ | $O(\log n)$ | $O(n)$ |

In an embodiment, a client device can determine that a word typed on the client device is a new word that is not contained in a dictionary or asset catalog on the client device. New words can be associated with classifications such as entertainment, health, finance, etc. A classification is a conglomeration of similar types of information. In an embodiment, each classification can be associated with one or more sessions, wherein each session can be associated with an application or product type. For example, the health classification can be associated with a personal fitness or health application. New words generated by the health or fitness application can be classified as health words. For example, "zika," a trending medical term, could be classified as a health word. Similarly, the classification can be associated with a finance application or a finance tab of a browser session. New words generated by a finance application or finance tab can be classified in the finance classification. For example, "corporate inversion," a trending financial term, could be classified in the financial classification. A differential privacy system on the client device can comprise a privacy budget for each classification of new words. New words generated by a user can be stored in a transmission buffer in preparation for being transmitted to a new word learning server. Words can be stored in the transmission buffer, organized by classification. It is possible to store more words in the transmission buffer than there is privacy budget available to transmit the words. To preserve the privacy budget, the transmission buffer can be periodically sampled to obtain a word for transmission to the new word learning server. If there is sufficient privacy budget available for the classification, the sampled word can be segmented into n-grams, an n-gram can be selected from the n-grams and processed using local differential privacy, then transmitted to a server. N-grams can be selected to be a particular length, such as 1 character (one-gram), 2 characters (bi-gram), etc. Throughout the disclosure, the term "n-gram" is used to generically refer to a sequence of characters having a specified length for a process. In an embodiment, a length of 2 is selected (bi-gram) to reduce search space complexity. Longer, or shorter, n-grams can be used. In an embodiment, an n-gram length can be selected based upon the language of the words to learn. In an embodiment, the client device can use local differential privacy to introduce randomness in the client data prior to sharing the data with a server that will learn the new words. In an embodiment, a server can test differentially private data received from a plurality of clients to determine whether the amount of randomization in the differentially private data is sufficient to maintain differential privacy of client data.

In an embodiment a non-transitory computer readable medium can store executable instructions, that when executed by a processing system, can perform any of the functionality described above.

In yet another embodiment, a processing system coupled to a memory programmed with executable instructions can, when the instructions are executed by the processing system, perform any of the functionality described above.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

Other features and advantages will be apparent from the accompanying drawings and from the detailed description.

The present disclosure recognizes that the use of personal information data collected from a large population of users, in the present technology, can be used to the benefit of all or many users. For example, the words that are introduced to the popular lexicon can be identified and included in on-device dictionaries. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Figure 1:
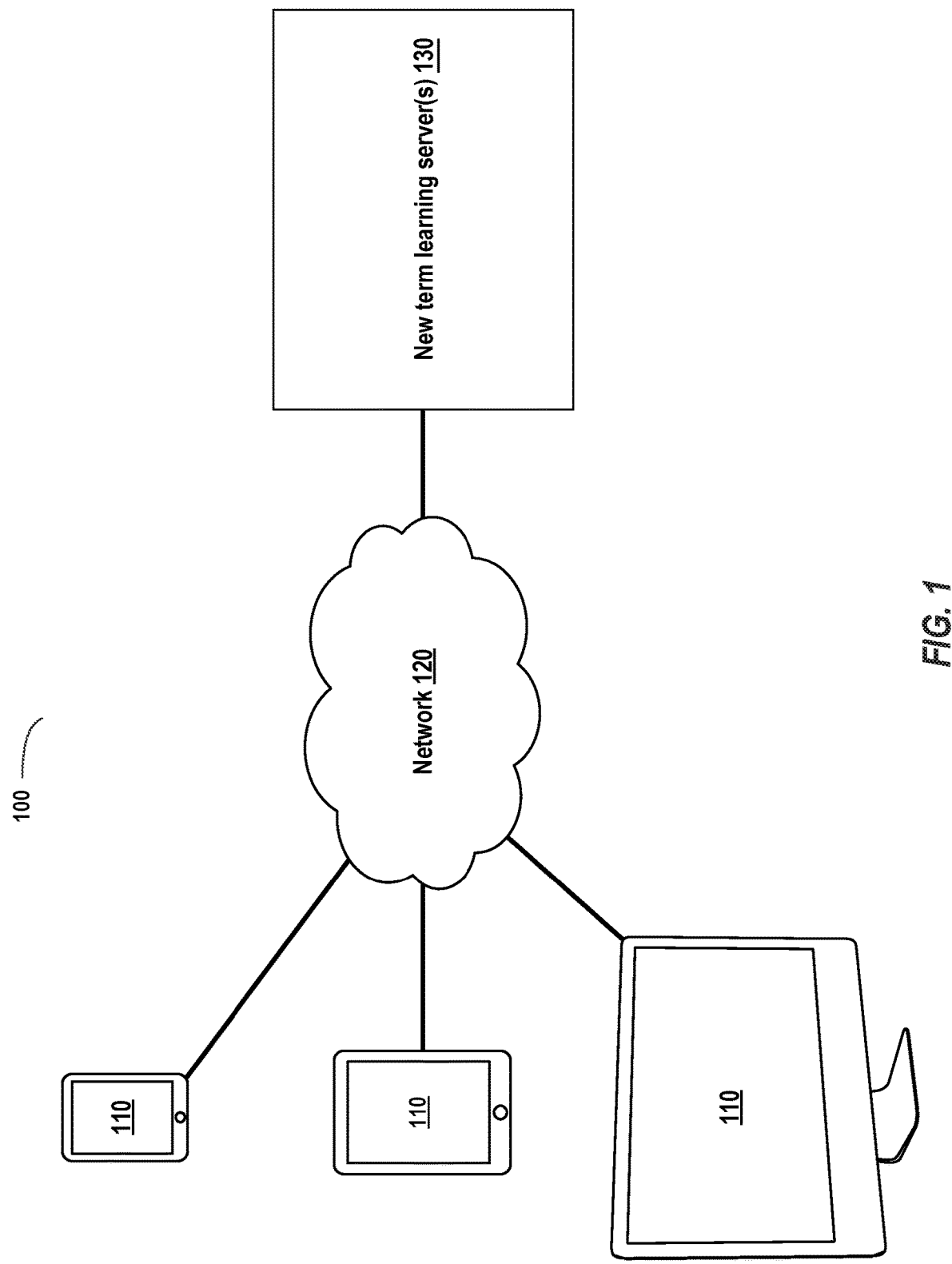
FIG. 1 illustrates, in block form, an overview of a system environment for learning new words used by clients while preserving client privacy, according to some embodiments.

FIG. 1 illustrates, in block form, an overview of a system environment 100 for learning new words used by clients while preserving user privacy, according to some embodiments.

Client devices 110, each associated with a user in a large plurality of users (crowdsource), can be coupled to a one or more new term learning server(s) 130 ("term learning server 130") via network 120. Each client device 110 can segment a new word into n-grams and send a differentially private sketch of the word and n-grams of the word to a term learning server. A sketch of a word is a computed, encoded representation of the word. The purpose of the sketch is to transmit the encoded representation of the word (sketch) to the server rather that the clear text of the word, so that the server cannot directly learn the word transmitted by only the one client. In a crowdsourced, client/server environment, a local differential privacy system generates the encoded representation such that randomness is introduced to client data (word) prior to a client sharing the word with a server. A server can learn the word from the aggregation of the crowdsourced data of all clients, but cannot learn the word provided by any particular client. Collectively, the differentially private sketches received from the large plurality of client devices 110 comprise crowdsourced data from which term learning server 130 can learn new words used among the large plurality of client devices 110, while maintaining privacy of each of the client devices 110. Client-side (local) differential privacy implemented in a crowdsourced data environment ensures that the term learning server 130 learns the new words of all client devices 110 without exposing whether any particular client device 110 uses the new words. Client device 110 can comprise any type of computing device such as a desktop computer, a tablet computer, a smartphone, a television set top box, or other computing device 110 such as iPhone®, Apple® Watch, Apple® TV, etc., as described below with reference to FIG. 10.

Network 120 can be any type of network, such as Ethernet, WiFi, Token Ring, Firewire, USB, Fiber Channel, or other network type.

Term learning server 130 can comprise one or more hardware processors, memory, storage devices such as one or more hard disks, solid state storage devices, CD-ROM storage, DVD-ROM storage, storage appliances, etc. Exemplary components of term learning server 130 are described below with reference to FIG. 10.

Figure 2:
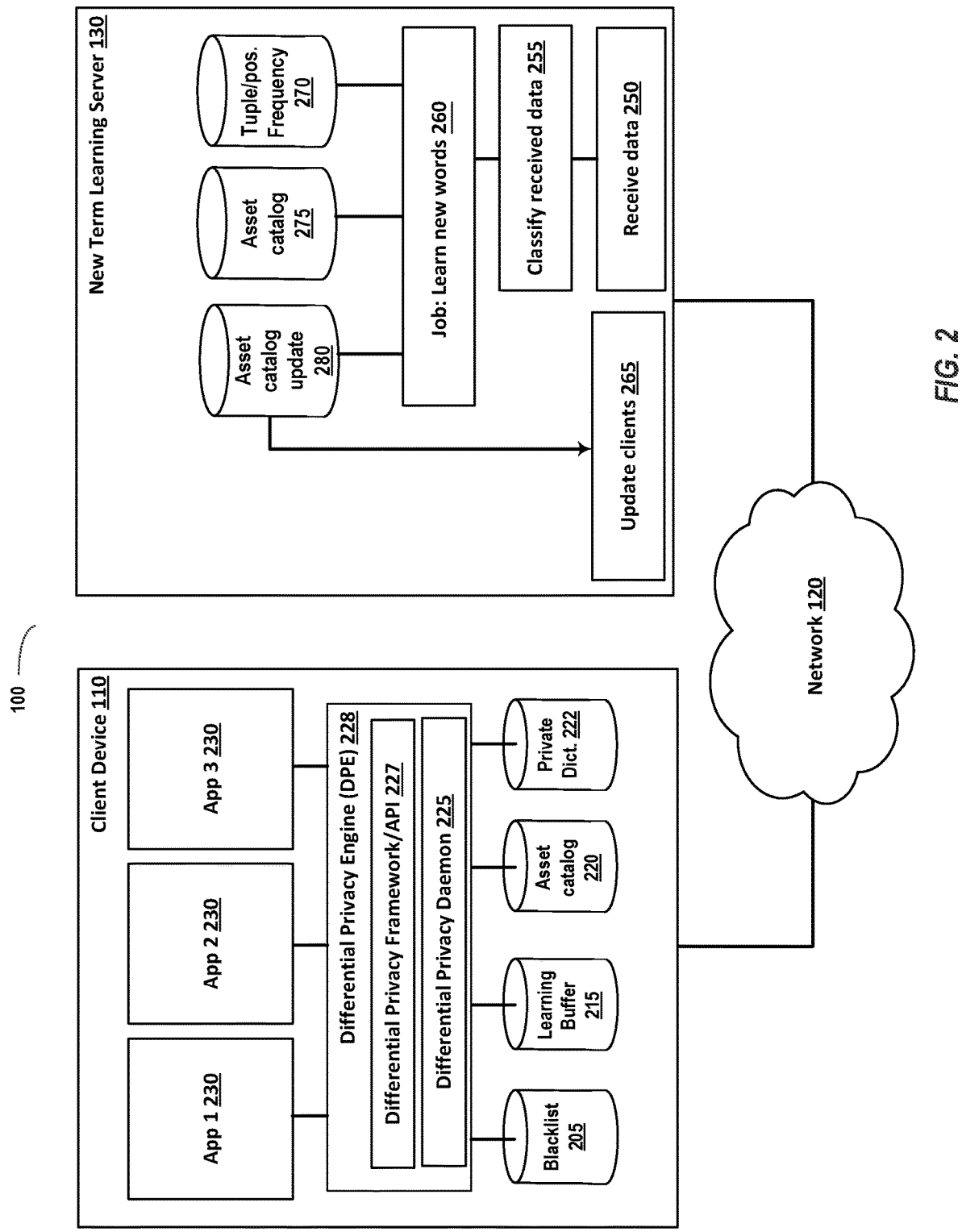
FIG. 2 illustrates, in block form, an detailed view of a system environment for learning new words used by clients while preserving client privacy, according to some embodiments.

FIG. 2 illustrates, in block form, a detailed view of a system environment 100 for learning new words used by clients while preserving user privacy, according to some embodiments.

Internal components of client device 110 can include a plurality of storages 205-222, a differential privacy engine (DPE) 228 that can comprises a differential privacy daemon 225 and a differential privacy framework or application programming interface (API) 227, and a plurality of applications 230, e.g. App 1, App2, and App 3. APIs are described in detail, below, with reference to FIG. 9.

Storages 205-222 can include a blacklist 205, a term learning buffer 215, an asset catalog 220, and private dictionary 222. Blacklist 205 can be used to determine words that are not to be sent to term learning server 130. A user may prefer to blacklist certain words as having a high level of privacy to the user such that the user does not want to transmit word to the term learning server 130 no matter how great the guarantee of privacy from the term learning server 130. Such words may include proper names, e.g. family members or surnames, proprietary technology words, and other words a user may proactively choose to keep private using blacklist 205.

Blacklist storage 205 can be used to store words that have been previously transmitted by client device 110 to term learning server 130, but the client device 100 has not yet received an updated asset catalog 280 from new term learning server 130 to replace the client device asset catalog 220. In an embodiment, differential privacy engine 228 can check the blacklist storage 205 before processing a word (e.g. generating differentially private n-grams). In an embodiment, differential privacy engine (DPE) 228 of a client device 110 sends a word to term learning server 130 only once. To preserve a privacy budget of the client device 110, a word that has been added to transmitted words storage 210 may not be re-sent to the term learning server 130. Once the client receives an updated asset catalog 220, words that appear within blacklist storage 205, that are now contained in the updated asset catalog 220, can be deleted from blacklist storage 205.

Privacy budget is a quantity that ensures the privacy of an individual is not compromised after repeated donation of information to the term learning server 130. A privacy budget E quantifies the amount of information leaked by a client device 110 to a server by providing the differentially private information to the server. Every submission to a server of differentially private information, e.g. a new word, consumes a portion ε of the privacy budget E for the client device 110. If a client device 110 submits k pieces of information through a privacy channel to a server, then e<E/k to ensure that the overall privacy budget E is not violated. A separate privacy budget is allocated to each classification of information. Each time a word is transmitted to term learning server 130, a privacy budget for a classification of the word is charged or reduced by some amount. For example, in the keyboard usage classification, if a client device transmits the words "zika" and "ebola" to the term learning server 130, the client device keyboard classification budget would be charged a portion of the privacy budget E for the keyboard classification for each transmitted word.

When data for a classification is purged from term learning server 130, it is possible to replenish or increase the privacy budget for the classification on a client device 110. Alternatively, the privacy budget for the classification can be replenished periodically on the client device 110. In an embodiment, replenishment of the client device 110 privacy budget for a classification can be synchronized with purging of client device data for one or more client devices on term learning server 130 or purging of all client device data on the term learning server 130. In an embodiment, replenishment of a client device privacy budget for a classification of words can be asynchronous with term learning server 130 purging client device data for a plurality of client devices 110.

A term learning buffer 215 can comprise a storage that holds candidate words for transmission to term learning server 130. A user may generate more new words than can be sent within a privacy budget for a classification of words. Thus, DPE 228 can store candidate words in term learning buffer 215, then sample the buffer later to determine a random candidate word to send to term learning server 130. Term learning buffer 215 can also store words that have been sampled from the candidate words and selected for transmission to the term learning server 130. In an embodiment, words are stored in term learning buffer 215 by classification. Each classification can have a privacy budget.

Client device 110 can further include a private dictionary 222 that stores words that a user of a client device 110 may want to consider familiar or frequent, i.e., known to the particular client device 110. In an embodiment, the user can designate a word in private dictionary 222 as eligible, or ineligible, for sending to the term learning server 130. Differential privacy engine 228 can receive a word from an application 230 and access the private dictionary 222 to determine whether the word is eligible to be sent to term learning server 130.

Term learning server 130 can comprise a receive data module 250, a classify received data module 255 to classify received data according to a classification system, and a job to learn new words 260 from received, de-identified sketch data. Term learning server 130 can further include one or more storages, including an n-gram/position frequencies storage 270, an asset catalog 275, and an updated asset catalog 280. A module to update clients 265 can publish the asset catalog update 280 to one or more client devices 110.

Receive module 250 can asynchronously receive sketches of n-grams of new words for a large plurality of client devices 110 ("crowdsourced data"). Receive module 250 can remove from the received sketch data any latent identifiers, such as IP address, meta data, session identifier, or other data that might identify a particular client device 110 that sent the sketch data.

Classify received data module 255 can extract classification data from the received sketches and group received sketch data by classification. For example, classify received data module 255 can receive sketches for the new words and group these sketches according to the keyboard usage classification.

Learn new terms job 260 can periodically process the received, de-identified, and classify sketch data received from the large plurality of client devices 110. Learn new terms job 260 can include operations that include accumulating frequencies of received n-grams, generating permutations of n-grams, trimming the permutations of n-grams, and determining candidate new words from the permutations of n-grams. Learn new terms job 260 can also update asset catalog 275 to generate asset catalog update with updated frequencies of known words.

Figure 3A:
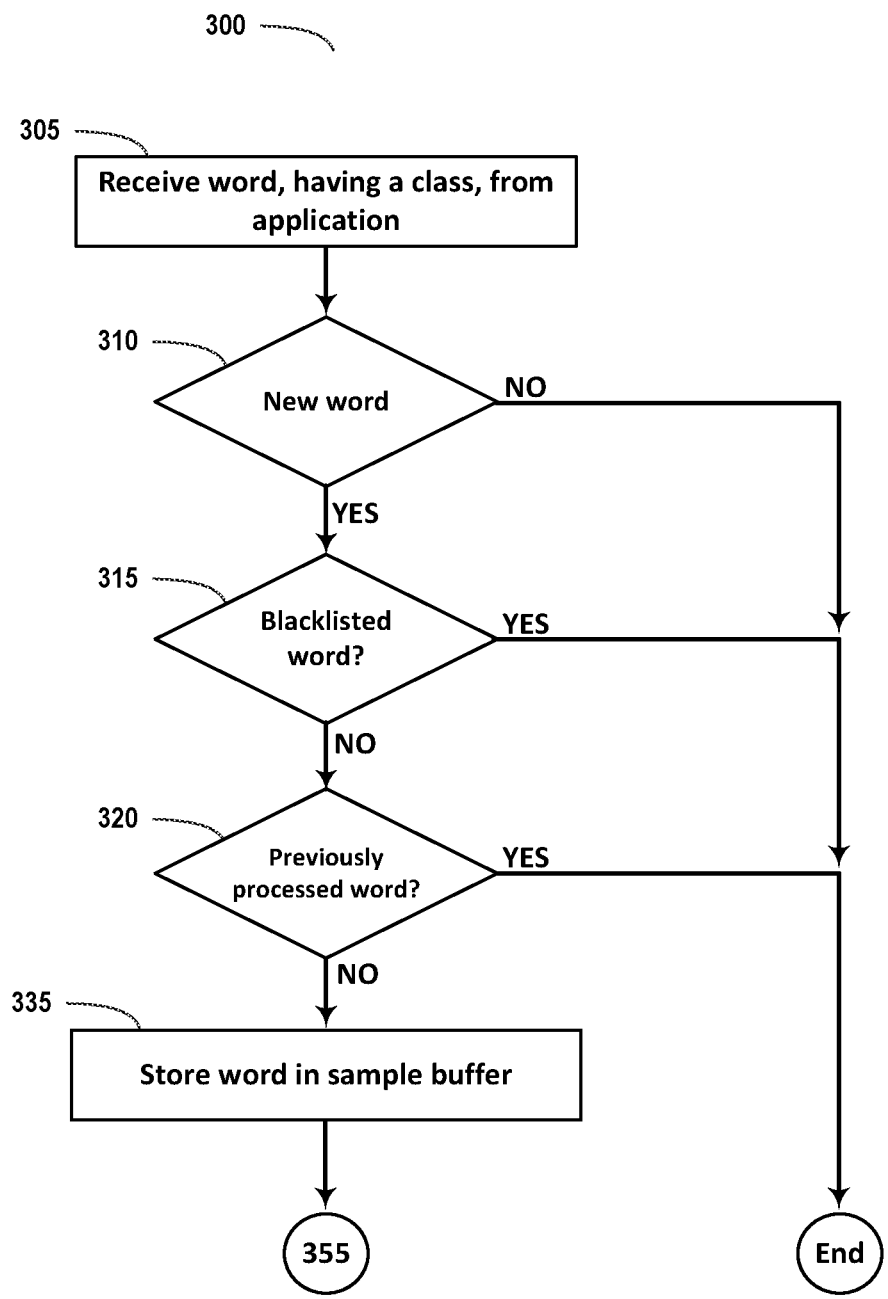
FIGS. 3A and 3B illustrate, in block form, a method of client-side processing for a server to learn new words from crowdsourced data while preserving client privacy, according to some embodiments.
Figure 3B:
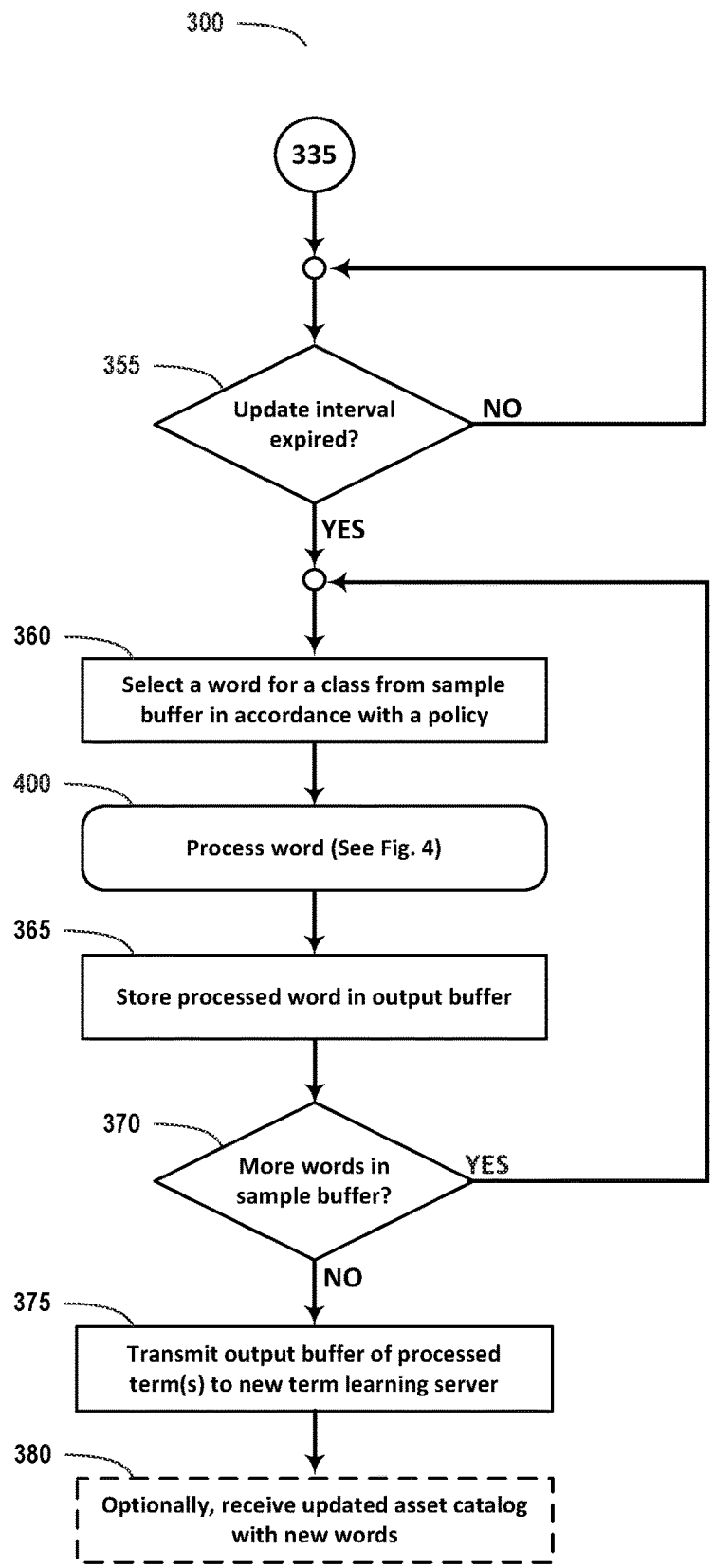

FIGS. 3A and 3B illustrate, in block form, a method 300 of client-side processing for a server to learn new words from crowdsourced data while preserving client privacy, according to some embodiments.

In operation 305, differential privacy engine (DPE) 228 can receive a new word from an application 230. The application 230 can identify a new word by comparing the new word to dictionaries included on the client device 110. If a word is not included in the dictionaries, then application 230 can determined that the new word is to be sent to the DPE 228. An application can be an email application, a messaging application, a word processing application, a web browser, a client device browser, an online store, or any other application. An application 230 can determine a classification (class) for the word. A class can be a language, e.g. English or Chinese. In an embodiment, a class can be shared by a plurality of applications 230. In an embodiment, a class can be health, finance, legal terms, or other use case classification. As an example, DPE 228 can receive the word "zika" from a messaging application 230 and determine that the word is associated with the keyboard usage classification. As another example, the DPE 228 can receive the number of steps a user takes over a period of time from a fitness application and determine that the number of steps is associated with a health classification. Each classification of words can have its own privacy budget.

In operation 310, DPE 228 can access asset catalog 220 to determine whether the word received in operation 305 is already known to term learning server 130, as evidenced by the presence of the word in asset catalog 220 or private dictionary 222. If the word is in the asset catalog 220 or in the private dictionary 222, then the method 300 ends. Otherwise the method 300 continues at operation 315.

In operation 315, application 230 or DPE 228 can determine whether the word is stored in blacklist storage 205. If the word is stored in blacklist storage 205 then method 300 ends. Otherwise, method 300 resumes at operation 320.

In operation 320, DPE 228 can determine whether the word has been previously processed by DPE 228. A previously processed word can include a term that has been previously transmitted to term learning server 130 by this client device 110 but is not yet found in an updated asset catalog 220 on the client device 110. A word that has been previously processed can also be a word that is stored in the learning buffer 215 that has not yet been transmitted to term learning server 130, but has been processed by DPE 228 on client device 110. If the word has been previously processed, then the method 300 ends. Otherwise, method 300 resumes at operation 325.

In operation 335, the word can be stored in a sample buffer or queue in learning buffer 215. After operation 335, method 300 resumes at operation 355 as described below with reference to FIG. 3B.

Words can be held in learning buffer 215 such that a batch of words is gathered together for sending to term learning server 130 within a time interval. Each time a word is sent, a portion of the privacy budget for a classification is charged. To preserve privacy budget for each classification of words, terms are held in a learning buffer 215, then, after an interval of time, a word is selected from a classification in the learning buffer 215 for processing. In an embodiment, the words in the buffer are processed in a queue order. In embodiment, a word is selected at random from the buffer in accordance with a policy. This process slows the rate at which new words are sent to the term learning server 130 and extends the life of the privacy budget. In an embodiment, DPE 228 can contain logic that determines when a privacy budget for a classification is depleted. DPE 228 can then monitor the elapsed time before the privacy budget is replenished. The time interval between client intervals of processing can be extended or contracted, based upon the amount of privacy budget available at any time. Before selecting a word, it can be determined whether there is privacy budget available to send the word to the new term learning server 130. A word may not be processed if there is no privacy budget available for the classification of the word.

In FIG. 3B, in operation 355, it can be determined whether an update interval has expired. If not, then the update interval can be periodically rechecked in operation 355 until the interval has expired. The update interval can be used to meter the donation of information from the client device 110 to the new term frequency server 130, to preserve privacy budget.

If in operation 355, the update interval has expired, then method 300 resumes at operation 360.

In operation 360, a word can be selected from the sample buffer in learning buffer 215. In an embodiment, the sample buffer can hold a plurality of words, optionally organized by classification, such that a word can be selected at random from the sample buffer for processing in preparation for transmission to term learning server 130. In an embodiment, words can be selected from the sample buffer in a queue order. In an embodiment, words can be selected from the sample buffer in a random order. In an embodiment, selection of words from the sample buffer can be performed in accordance with a policy. A policy can be determined per application, or per classification of words.

In operation 400, the selected word is processed for sending to term learning server 130. Operation 400 is described in detail below with reference to FIG. 4.

In operation 365, the processed word can be stored in a buffer in learning buffer 215 for transmission to new term learning server 130.

In operation 370, it can be determined whether there are more words in the sample buffer to consider for processing and transmission to term learning server 130. If so, then method 300 resumes at operation 360, otherwise method 300 resumes at operation 375.

In operation 375, an output buffer of processed words can be transmitted to term learning server 130.

In operation 380, client device can optionally receive an updated asset catalog from term learning server. The updated asset catalog 220 can have one or more new terms added by the term learning server 130 in response to crowdsourced data received by term learning server 130.

In an embodiment, the words that were processed and transmitted to term learning server 130 in operation 375 can be stored in blacklist storage 205. In an embodiment, application 230 that initially selected the word for processing in operation 305 of FIG. 3A can determine whether the word should be added to blacklist storage 205.

Figure 4:
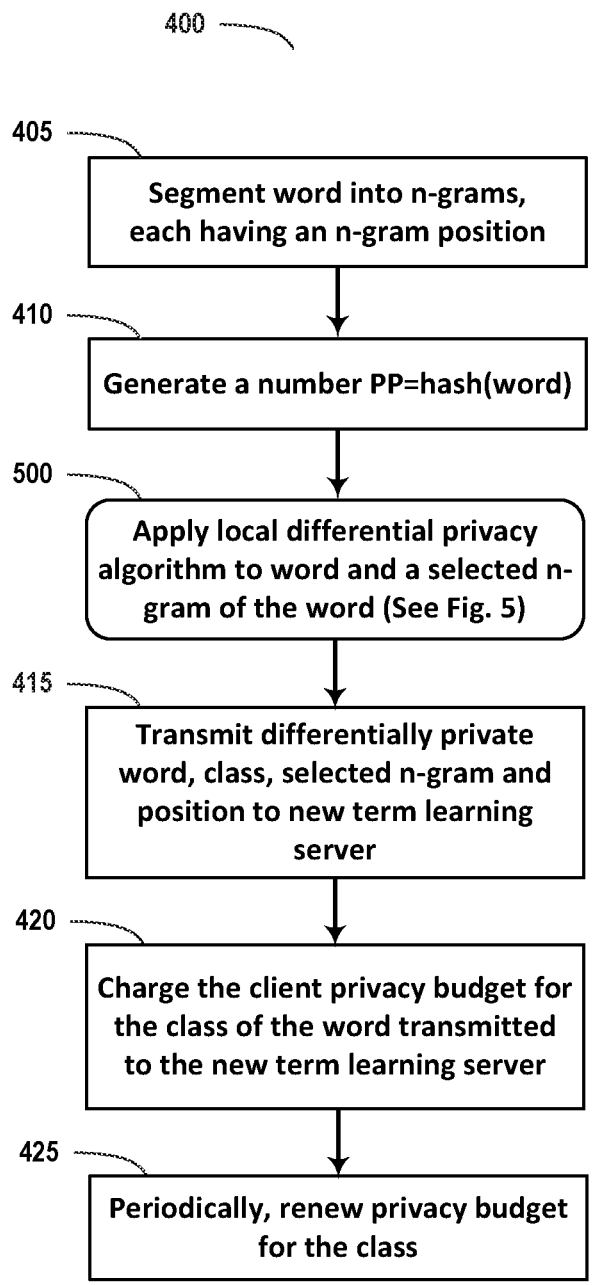
FIG. 4 illustrates a method of a client device to break a new word into differentially private n-grams in preparation for transmitting the differentially private n-grams to a new term learning server while preserving client privacy, according to some embodiments.

FIG. 4 illustrates a method of operation 400 on a client device to break a new word into n-grams in preparation for transmitting a selected one of the n-grams in a differentially private form to a new term learning server while preserving client privacy, according to some embodiments.

In operation 405, the new word can be segmented into n-grams. In an embodiment, an n-gram can be a single character in length ("one-gram"). A single n-gram length may be appropriate for a language such as Chinese, wherein a single symbol can represent one or more words. In another embodiment, n-gram length can be two characters ("bi-gram"). In an embodiment, an n-gram can be three, or four, characters long. Each n-gram has a position in a word. For example, if a new word is, "bazinga," and the n-gram length is two, then a first n-gram would comprise "ba," a second n-gram would comprise "zi," a third n-gram would comprise "ng," and a fourth n-gram would comprise "a<null>."

In operation 410, a number can be generated that is a hash of the new word and associated with the new word and each n-gram of the new word ("a puzzle piece"). In an embodiment, the hash can comprise the SHA256 hash algorithm, or other hash algorithm. The term learning server 130 can use the number as a puzzle piece to associate n-grams together in combinations to identify new words at the new term learning server 130.

In operation 500, DPE 228 can apply a differential privacy algorithm to the new word and to a selected n-gram of the new word. Operation 500 is described in detail with reference to FIG. 5, below.

In operation 415, DPE 228 can transmit the differentially private word and selected differentially private n-gram of the word to term learning server 130, along with selected n-gram position data, and class information of the new word.

In operation 420, DPE 228 can charge the client device privacy budget for the classification of the new word transmitted to the term learning server 130. For example, after the DPE 228 transmits the differentially private data to the term learning server 130, the privacy budget for the classification of the new term can be reduced or adjusted to reflect the transmission.

In operation 425, DPE 228 can periodically replenish or increase the privacy budget for the classification on the client device 110. In an embodiment, replenishing or increasing the privacy budget for a classification is asynchronous with the transmission of new term learning information in operation 415.

Figure 5:
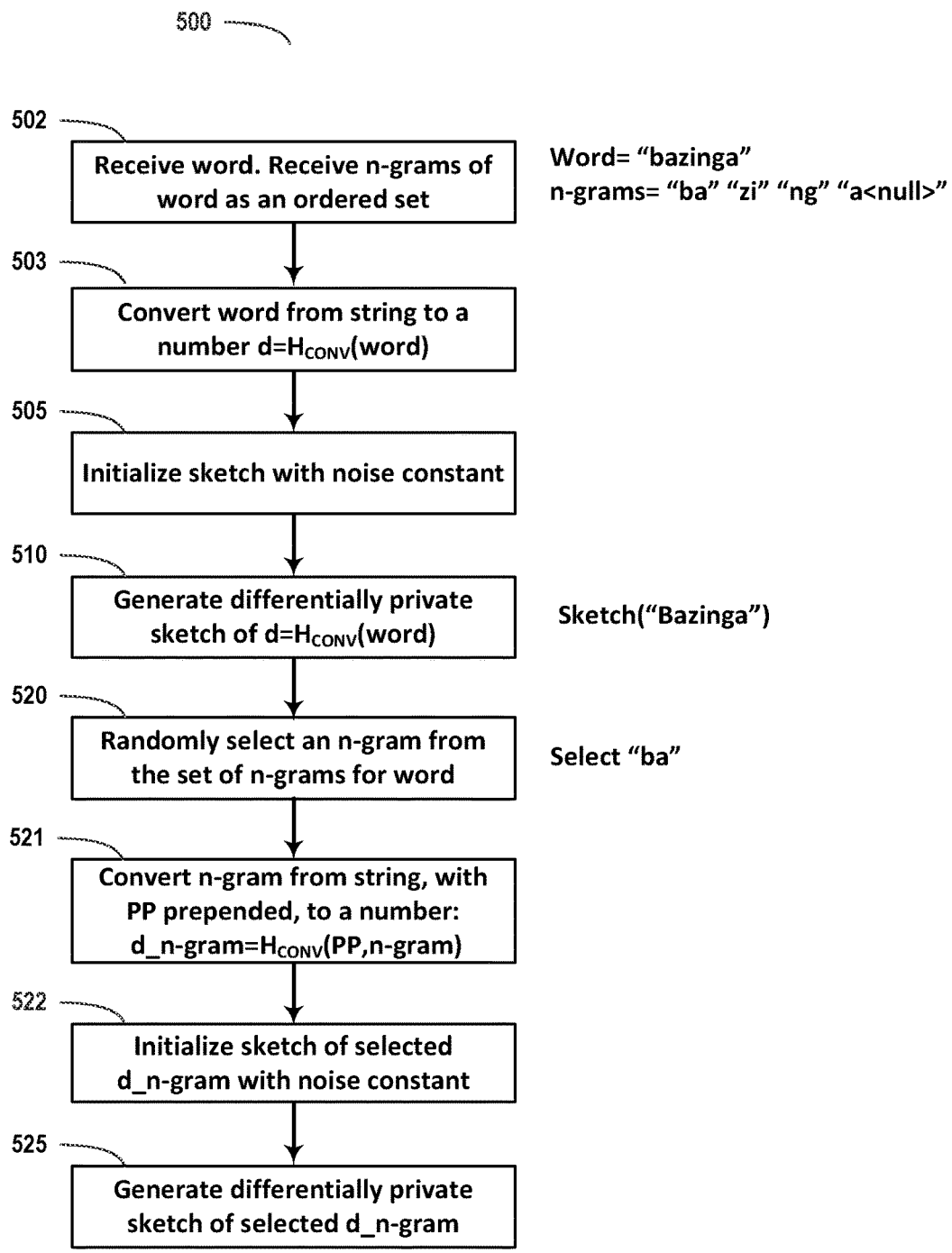
FIG. 5 illustrates a method of a client applying a differential privacy algorithm to n-grams of a new word, according to some embodiments.

FIG. 5 illustrates a method of operation 500 on a client for applying a differential privacy algorithm to a word and n-grams of a new word to generate a local differentially private sketch of the word and the n-grams of the new word, according to some embodiments.

A sketch provides a succinct data structure to maintain a frequency of a domain of elements $S=\{s_1, \ldots, s_p\}$ present in a data stream $D=\{d_1, \ldots\}$. Let $H=\{h_1, \ldots, h_k\}$ be a set of k pair-wise independent hash functions such that each $h \in H$ is h: $S \rightarrow [m]$. Client and server differential privacy algorithms can agree on a common set of k pair-wise independent hash functions $H=\{h_1, \ldots, h_k\}$ which map to $[0 \ldots m)$. In an embodiment, m can be $\sqrt{n}$, wherein n is a number of client samples of data to be collected by the server. The value m can be a nearest power of 2 to the value of $\sqrt{n}$. In an embodiment, k can be approximately $8 \cdot \ln(p)$, wherein p is approximately equal to $|S|$; the count of data items in S for the classification of terms.

A client-side local differentially private sketch can be one of two types: (1) an ε-local differentially private sketch, $A_{CLIENT}$, or (2) a Hadamard ε-local differentially private sketch, $A_{CLIENT\text{-}Hadamard}$.

In operation 502, DPE 228 can receive the new word and n-grams as an ordered set. In an example, the candidate new word is "bazinga," a word made popular by a television show. In the example, n-grams are length 2 (bi-grams), such that an ordered set of n-grams for the word "bazinga" is: "ba" "zi" "ng" and "a<null>," where null signifies the end of the word "bazinga." Bazinga has been determined to be a candidate new word as shown in FIG. 4, above. Bazinga was not in the blacklist 205, bazinga was not in the learning buffer storage 215, bazinga was not in the asset catalog 220, and bazinga was not found in the private dictionary 222.

In operation 503, DPE 228 can convert the word to a numeric value by taking a hash of the string representation of the word, $d=H_{CONV}(word)$, e.g. $d=SHA256(word)$. The word is encoded as a number, d, in the range of 0 . . . m, using $H_{CONV}$, wherein m is the square root of the estimated size |S| of the vocabulary S of the classification. In an embodiment, $d=H_{CONV}(word)$ modulo m, such that $d \in [0, m)$. The size of a vocabulary for a classification can vary by classification.

Operations 505 and 510 differ slightly as between client-side local differentially private sketch algorithms $A_{CLIENT}$, and $A_{CLIENT\text{-}Hadamard}$. The operations 505 and 510 for $A_{CLIENT}$ will be described first.

Input for the client-side ε-local differentially private algorithm, $A_{CLIENT}$, can include: (1) privacy parameter, ε; (2) hashing range, m; (3) k pair-wise independent hashing functions $H=\{h_1, \ldots, h_k\}$ with each $h_i: S \rightarrow [m]$; and (4) data element: $d \in S$.

For algorithm $A_{CLIENT}$, in operation 505, a noise constant $$c_\varepsilon \leftarrow \frac{e^\varepsilon + 1}{e^\varepsilon - 1},$$

can be calculated and a vector v can be initialized: $v \leftarrow -c_\varepsilon^m$. Constant $c_\varepsilon$ keeps the noise added to maintain privacy at mean zero, unbiased.

In operation 510, the sketch for the word (or n-gram) can be generated with $A_{CLIENT}$ with the following operations.
1. Sample uniformly at random a hash function h independent and identically distributed (i.i.d.) from a set of hash functions $H=(h_1, \ldots, h_k)$ and set vector $v[h(d)] \leftarrow c_\varepsilon$.
2. Sample a vector $b \in \{-1,+1\}^m$, with each $b_j$ independent and independently distributed having +1 with probability $$\frac{e^\varepsilon}{e^\varepsilon + 1}$$

3.

$$v_{priv} = \left\{\left(\frac{v[j] * b[j] + 1}{2}\right), \forall j \in [m]\right\}$$

Return vector $v_{priv}$ and the chosen hash function h.

If the client, generates the Hadamard version of the ε-local differentially private sketch using the $A_{CLIENT\text{-}Hadamard}$ algorithm, the inputs to $A_{CLIENT\text{-}Hadamard}$ can be: (1) privacy parameter, ε; (2) hashing range m; (3) k pair-wise independent hashing functions $H=\{h_1, \ldots, h_k\}$ with each $h_j: S \rightarrow [m]$; and (4) data element $d \in S$.

Operations 505 and 510, below, form a part of the operations of the algorithm $A_{CLIENT\text{-}Hadamard}$ that generates the Hadamard version of the ε-local differentially private sketch.

In operation 505, a constant $$c_\varepsilon \leftarrow \frac{e^\varepsilon + 1}{e^\varepsilon - 1}$$

can be calculated and a vector v can be initialized: $v \leftarrow [0]^m$.

In operation 510, the algorithm $A_{CLIENT\text{-}Hadamard}$ further includes the following operations:
1. Sample uniformly at random a hash function h independent and identically distributed from a set of hash functions $H=\{h_1, \ldots, h_k\}$ and set vector $v[h(d)] \leftarrow 1$.
2. Generate a vector $$v_{Hadamard} \leftarrow \frac{1}{\sqrt{m}} \cdot H_m \cdot v,$$

wherein $H_m$ is a Hadamard matrix of dimension m.
3. Sample an index j, independent and identically distributed in [m] and a bit $b \in \{-1,1\}$ such that b is "1" with probability $$\frac{e^\varepsilon}{e^\varepsilon + 1}.$$

4. Return $c_\varepsilon \cdot b \cdot v_{Hadamard}[j]$, the selected hash function h, and the selected index j.

In operation 520, an n-gram is randomly selected of the new word "bazinga" from the set of n-grams {ba, zi, ng, a<null>} that make up the word. For example, n-gram "ba" can be randomly selected from the set of n-grams for the new word, "bazinga." In an embodiment, the set of n-grams can be an ordered set.

In operation 521, DPE 228 can convert the randomly selected n-gram to a numeric value by taking a hash of the string representation of the n-gram with the puzzle piece (PP) prepended, $d\_n\text{-}gram=H_{CONV}(PP,n\text{-}gram)$, e.g. $d\_n\text{-}gram=SHA256(PP, n\text{-}gram)$. The n-gram and puzzle piece can be encoded as a number, d_n-gram in the range of 0 . . . m using $H_{CONV}$. In an embodiment, $d\_n\text{-}gram=H_{CONV}(PP, n\text{-}gram)$ modulo m, such that $d\_n\text{-}gram \in [0, m)$.

In operation 522, DPE 228 can initialize a sketch of the d_n-gram with a noise constant, analogous to the operation 505 described above.

In operation 525, DPE 228 can generate a differentially private sketch of the d_n-gram as described above in operations 510 above.

Figure 6:
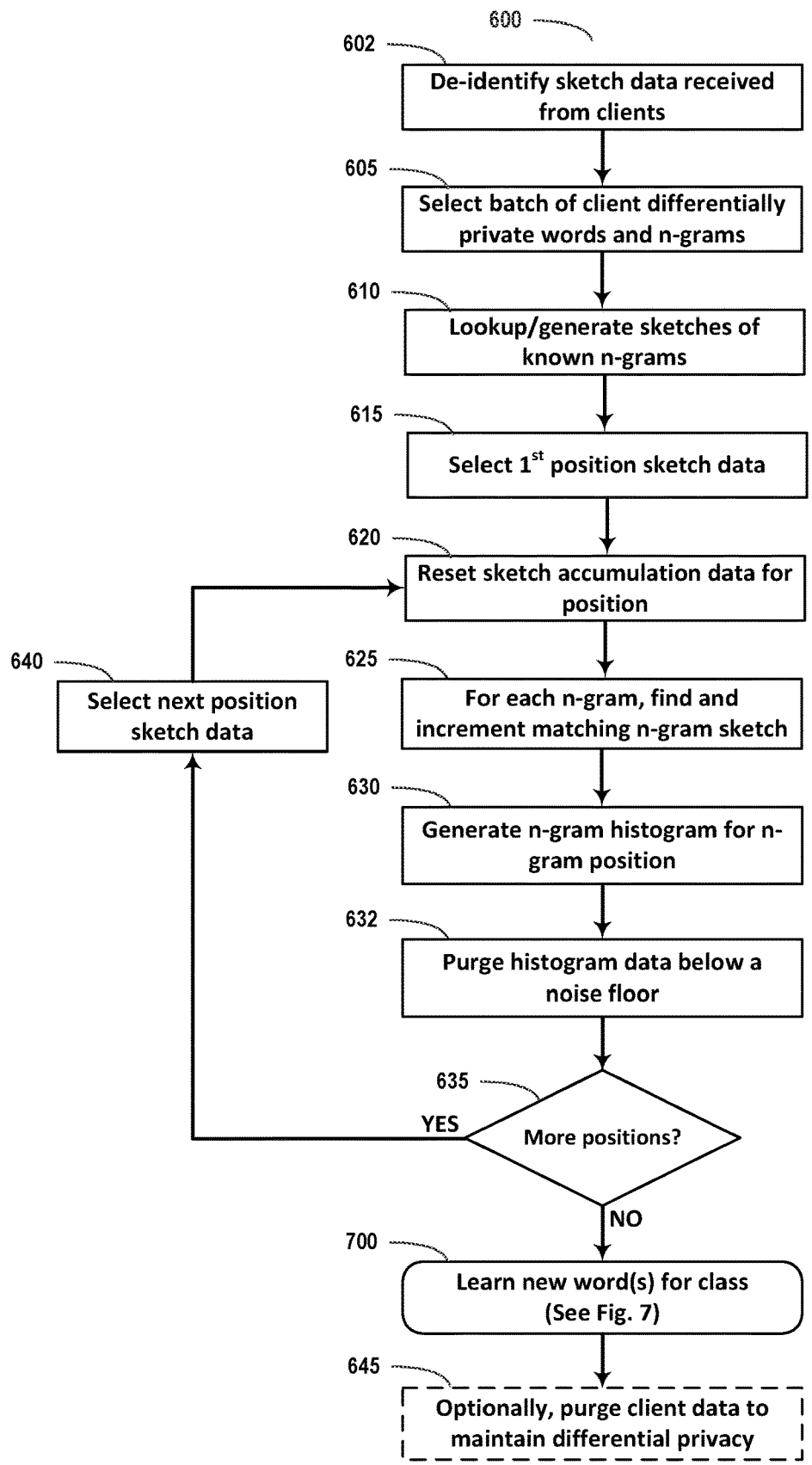
FIG. 6 illustrates a method of a server accumulating frequencies of differentially private words and n-grams received from crowdsourced data, while preserving client privacy, according to some embodiments.

FIG. 6 illustrates a method 600 of a server accumulating frequencies of differentially private sketches of words and n-grams received from crowdsourced data, while preserving client privacy, according to some embodiments.

In operation 602, term learning server 130 de-identifies word and n-gram sketch data received from clients 110. De-identification can include removing an internet protocol (IP) address from the received data, removing any metadata that identifies, or can be used to identify, a particular client with reasonable specificity.

In operation 605, term learning server 130 selects a batch of differentially private words and n-grams for a large plurality of clients from the received and de-identified client data 255.

In operation 610, term learning server 130 can generate, or retrieve, a sketch for each known n-gram. A sketch of an n-gram can be used as an index to match a received n-gram sketch with a known n-gram sketch so that the frequency of the n-gram at a position can be accumulated. In an embodiment, frequently occurring n-grams can have a pre-generated sketch stored in tuple/position database 270. For example, in a first position, the n-gram, "th" is a commonly occurring n-gram as it starts many words. In an embodiment, a sketch of each n-gram is stored in tuple/position database 270 for all n-grams, e.g. "aa," "ab," "ac," etc.

In operation 615, learn new words job 260 can select all n-grams from the received data 255 that are in the first position of the term from which the n-gram was extracted, e.g. the first position bi-gram in the word "term" is "te."

In operation 620, term learning data can be reset. Term learning data can include a histogram of n-gram frequencies per n-gram position, a histogram of new term frequencies, an n-gram permutations data structure, and other data structures necessary to implement the word learning logic herein.

In operation 625, for each selected n-gram sketch for the position, a matching sketch is looked up and incremented in a histogram of n-grams for the position. The specific operations for updating the histogram of n-grams at a position can depend upon whether the client used the ε-local differentially private sketch algorithm, $A_{CLIENT}$, or the Hadamard ε-local differentially private sketch algorithm $A_{CLIENT\text{-}Hadamard}$. The operations for each are described below.

In the case that the client used the $A_{CLIENT}$ algorithm to generate the selected n-gram sketch, then in operation 625, the selected sketch data, vector $v_{priv}$, is added to the matching sketch data $W_{k,m}$, as follows:

For row $W_h$, corresponding to the selected hash function that was used to generate $v_{priv}$, set $W_h$ to $W_h+v_{priv}$.

In the case that the client used the $A_{CLIENT\text{-}Hadamard}$ algorithm to generate the selected sketch, then in operation 625, the selected sketch data, vector $v_{Hadamard}$, is added to the matching sketch data $W_{k,m}$, as follows:

1. For row $W_h$, corresponding to the selected hash function h that was used to generate $v_{Hadamard}$, set $W_h = W_h+v_{Hadamard}$.
2. Before determining a count-minimum or count-maximum for the sketch W, convert the rows from Hadamard basis to standard basis:

$W[i]=\sqrt{m}\cdot H_m\cdot W[i], \forall i \in k$, where $H_m$ is a Hadamard matrix of dimension m.

In operation 632, the frequency histogram of n-grams for the position can be ordered by n-gram frequency, from highest to lowest. A noise floor frequency value can be determined. N-grams in the ordered histogram for the position having a frequency below the noise floor can be discarded and excluded from further processing. In an embodiment, if there are "n" samples of n-gram data in the histogram, then the noise floor=

$$c * \frac{\sqrt{n}}{\varepsilon},$$

where ε is a differential privacy constant, and c is a constant.

In operation 635, it can be determined whether there are more positions of clients' differentially private words and n-grams to process. If so, then the method 600 continues at operation 620. Otherwise the method 600 continues at operation 700.

In operation 700, learn new terms job 260 can learn new words for the selected class of words using the accumulated differentially private n-gram sketches and word sketches. Operation 700 is described in detail, below, with reference to FIG. 7.

In operation 645, learn new terms job 260 can optionally purge some or all of the received differentially private n-gram and word sketch data to help maintain the differential privacy of users of the client devices 110.

Figure 7:
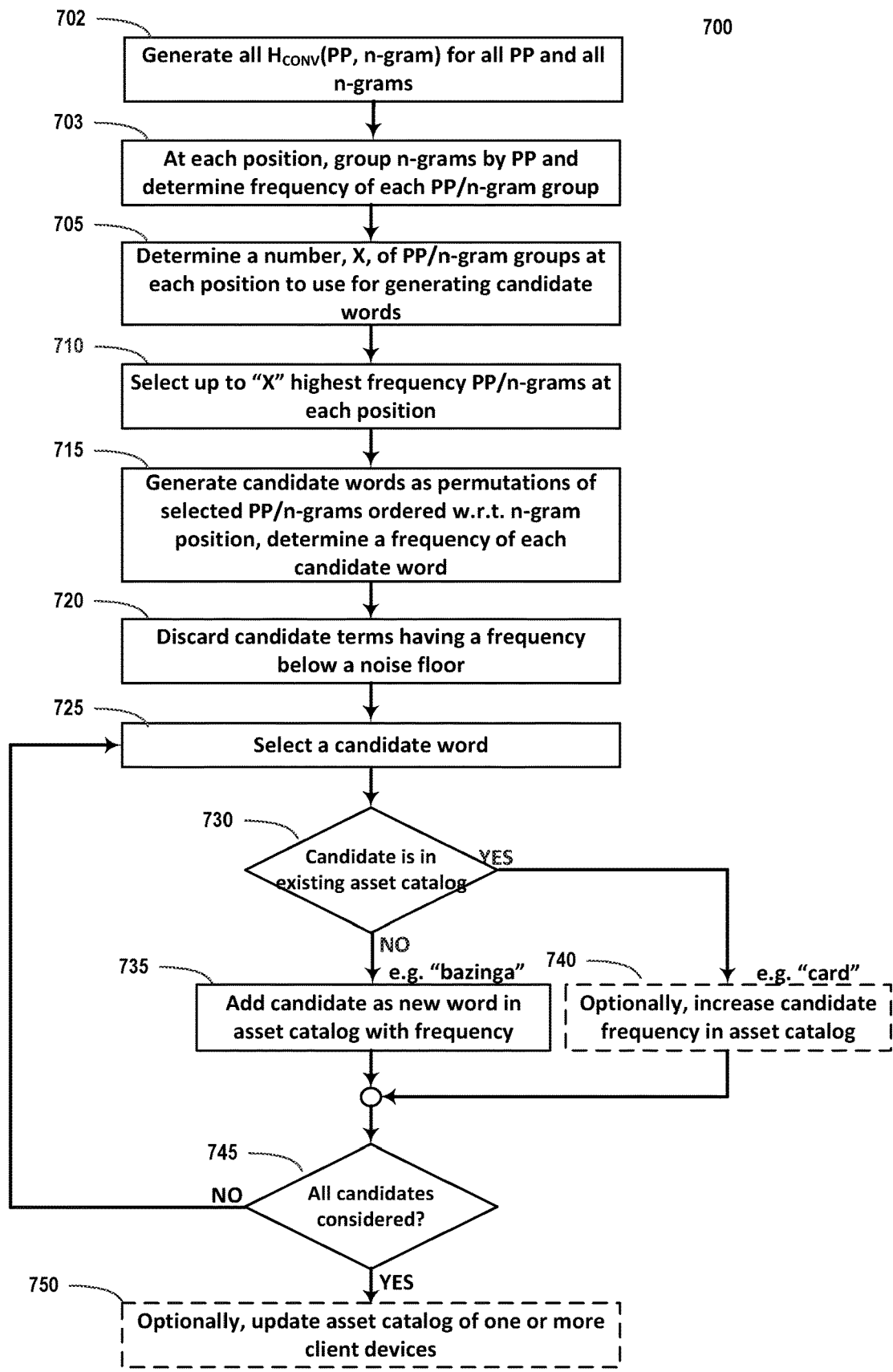
FIG. 7 illustrates a method of a server learning new words using accumulated frequencies of differentially private words and n-grams received from crowdsourced data, while preserving client privacy, according to some embodiments.

FIG. 7 illustrates a method 700 of a server learning new words using accumulated frequencies of differentially private sketches of words and n-grams received from crowdsourced data, while preserving client privacy, according to some embodiments. Each of the n-gram sketches at a position can be partitioned into groups having the same puzzle piece (PP) value. The puzzle piece signifies an n-gram sketch at a position that belongs with an n-gram sketch at another position based on the n-gram sketches having been obtained from the same word having the same puzzle piece value. The histogram of frequencies of n-gram sketches at positions, generated in FIG. 6 operation 632, can be partitioned into puzzle piece groups of n-gram sketches. The histogram can be grouped as ordered pairs of (n-gram sketch, puzzle piece), each having a frequency.

In operation 702, new term learning server 130 can generate an n-gram sketch as $H_{CONV}(PP, n\text{-}gram)$ for each PP and each possible n-gram. Any particular generated $H_{CONV}(PP, n\text{-}gram)$ is the same as if $H_{CONV}(PP, n\text{-}gram)$ were generated on a client device 110. Server $H_{CONV}(PP, n\text{-}gram)$ values can be stored in association with the puzzle piece used to generate $H_{CONV}(PP, n\text{-}gram)$, so that $H_{CONV}(PP, n\text{-}gram)$ values can be easily grouped by puzzle piece by new term learning server 130.

In operation 703, new term learning server 130 can use the histogram of operation 632 of FIG. 6 to determine a frequency of received from crowdsourced client data of each $H_{CONV}(PP, n\text{-}gram)$ at each position in the histogram. New term learning server 130 can group $H_{CONV}(PP, n\text{-}gram)$ at each position by puzzle piece (PP) and n-gram sketch such that the frequency of a particular n-gram sketch having a particular puzzle piece can be determined.

In operation 705, a number of puzzle piece groups of n-grams, "x", having a highest frequency at a position can be determined that represents the number of puzzle piece groups of n-grams to use at each position for generating candidate words. The value x can depend upon the a maximum number of candidate words that the term learning server 130 is configured to process. For example, if a server is configured to process a maximum of ten million words comprising a maximum of 7 bi-grams (therefore a maximum word length of 14 symbols), then the value x can be determined as:

$$x = \sqrt[7]{10,000,000} = 10 \text{ bi-grams}$$

at each position. The value of x can vary depending on a number of factors, including the language that is being processed for candidate words.

In operation 710, up to "x" puzzle piece groups of n-grams having the highest frequency for the position can be selected for generating candidate words.

In operation 715, a set of ordered combinations of n-grams can be generated from the selected puzzle piece groups of n-grams at each position to generate candidate new words. Each of the "x" n-grams having the same puzzle piece selected at the first position can be permuted with each of the "x" n-grams having the same puzzle piece at the second position, etc., for all positions that the server is configured to process. The puzzle piece signifies an n-gram at a position that belongs with an n-gram at another position based on the n-grams having been obtained from the same word having the same puzzle piece value.

In operation 720, candidate words having a frequency less than a noise floor can be discarded. In an embodiment, the noise floor is calculated similarly to the noise floor for n-grams, scaled by the maximum number of configured n-grams per candidate word maximum.

The search space of candidate words can alternatively, or in addition, be trimmed by a number of techniques. In an embodiment, natural language processing (NLP) techniques can be applied to trim combinations that are illogical or do not occur in a particular vocabulary. For example, an n-gram "ee" would not be followed by any of the following n-grams: "oo" "ii" "uu" "zz", etc. Permutations of such n-gram sequences can be trimmed from the set of combinations.

In an embodiment, an A* search can be performed, wherein the shortest combinations are traversed first to determine candidate words. NLP can be used to find combinations that are not viable and thus can be trimmed from the set of candidate combinations.

The above methods of trimming the search space of candidates can be used alone, or in combination, to trim the search space before using the n-grams to learn new words.

In operation 725, a candidate word can be selected from the candidate words.

In operation 730, it can be determined whether the candidate new word is in an existing asset catalog or dictionary of words. Theoretically, a newly found candidate word should not be found in an asset catalog or dictionary on new term learning server 130. Client devices should have the latest asset catalog containing the latest known words, and the asset catalog is used by the client device to help eliminate known words from client and server processing. It is possible, however, that a client may not have upgraded to the latest asset catalog and thus the client may have sent a word that appears new to the client but is known to the server.

If, in operation 730, it is determined that the candidate word is in an existing asset catalog or dictionary of words, then in an embodiment, a frequency of the word can optionally be increased.

If, in operation 730, it is determined that the candidate word is a new word, then the new word can be added to an updated asset catalog 280.

In operation 745, it can be determined whether the permutations tree traversal is complete. If not, then method 700 continues at operation 725, otherwise method 700 continues at operation 750.

In operation 750, term learning server 130 can optionally transmit an updated asset catalog to one or more client devices.

Figure 8:
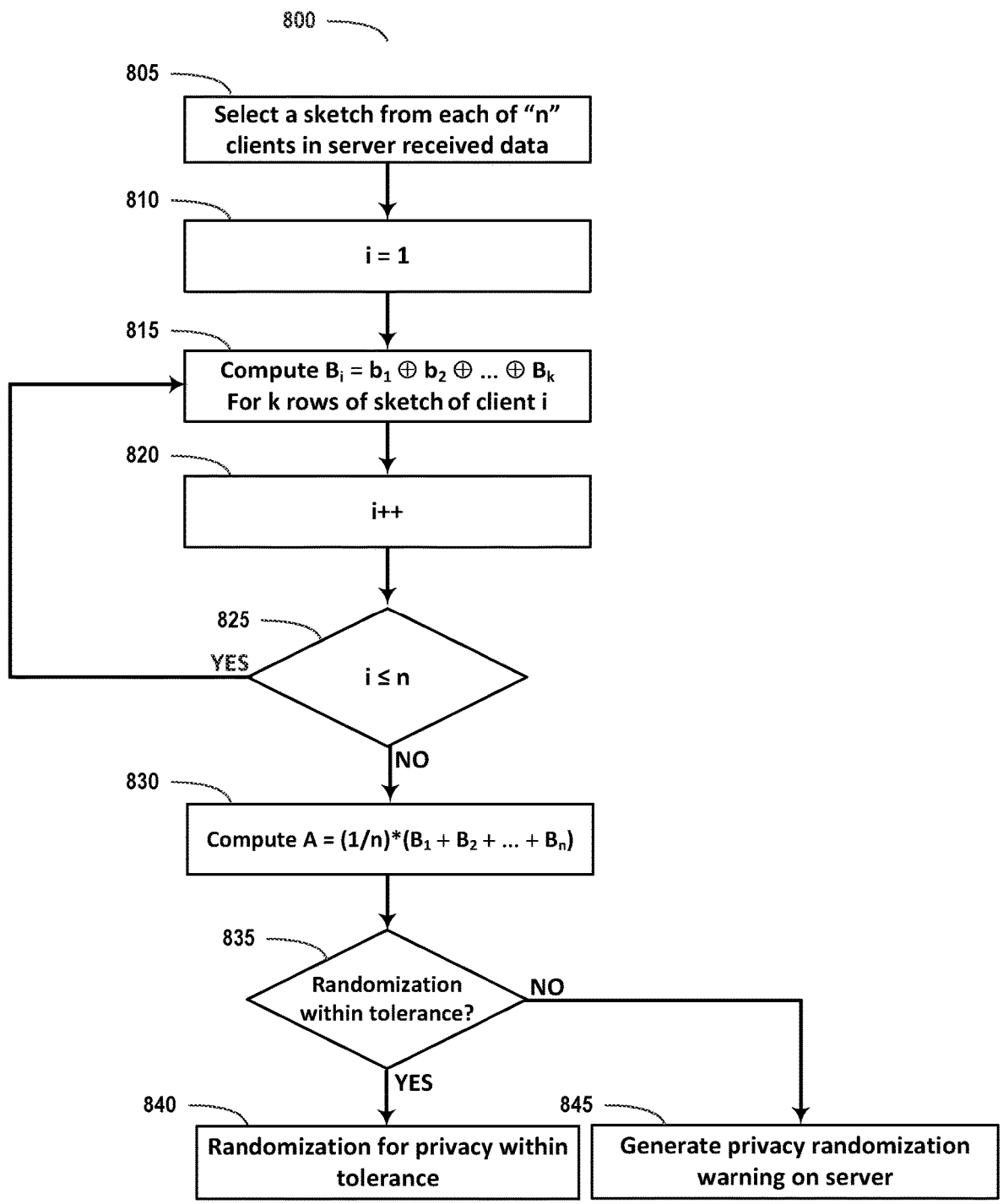
FIG. 8 illustrates a server privacy bit-test to ensure sufficient randomization of received data from crowdsourced clients, according to some embodiments.

FIG. 8 illustrates a method 800 to perform a server privacy bit-test, which ensures sufficient randomization of received data from crowdsourced clients, according to some embodiments. Maintaining privacy of client device users in a differential privacy environment relies in part upon randomization in algorithms used to implement differential privacy. If randomization is not sufficiently random, then differential privacy may not be sufficiently maintained. The server privacy bit-test tests the randomization of differentially private sketch data received from client devices.

In operation 805, a differentially private sketch can be selected for each of "n" clients represented in the received and de-identified data on new term learning server 130. A bit is generated from the sketch of each client by XORing the 1-bit vector of each row of the sketch for the client.

In operation 810, a loop iterator variable, i, is set to 1.

In operation 815, each bit $b_1 \ldots b_k$ of a row of sketch i, compute:

$$B_i = b_1 \oplus b_2 \oplus \ldots \oplus b_k.$$

In operation 820, increment client counter variable i.

In operation 825, it can be determined whether there are more client sketches to process. If so, then method 800 continues at operation 815. Otherwise, method 800 continues at operation 830.

In operation 830, a sum of bits is computed using all of the $B_i$, i=1 ... n, computed above for one sketch for each client i, of n clients. The sum A is computed as:

$$A = \frac{1}{n} \cdot \sum_{i=1}^{n} B_i$$

In operation 835, a randomization tolerance is computed and it can be determined whether the randomization of clients is within tolerance. In an embodiment, the randomization tolerance can be computed as:

If $$\left| A - \frac{1}{2} \right| \geq \frac{3}{2 \cdot \sqrt{n}} + \left(1 - \frac{2}{1+e^\varepsilon}\right)^k$$

then randomization tolerance fails, else randomization tolerance succeeds.

In an embodiment, randomization tolerance can be computed as:

$$A \in \frac{n}{2} \pm \sqrt{n}$$

If $$|A| \in \frac{n}{2} \pm \sqrt{n}$$

then randomization tolerance succeeds, otherwise randomization tolerance fails.

If, in operation 835, randomization tolerance succeeds, then in operation 840, a message can be generated to a user interface of new term learning server 130 indicating that randomization is within tolerance, otherwise in operation 845 and message can be generated to the user interface of new term learning server 130 indicating that randomization is not within tolerance, indicating that measures need to be taken to further ensure client device differential privacy.

Measures could include modifying a randomization algorithm, purging more client device data and/or purging client device data more frequently.

Figure 9:
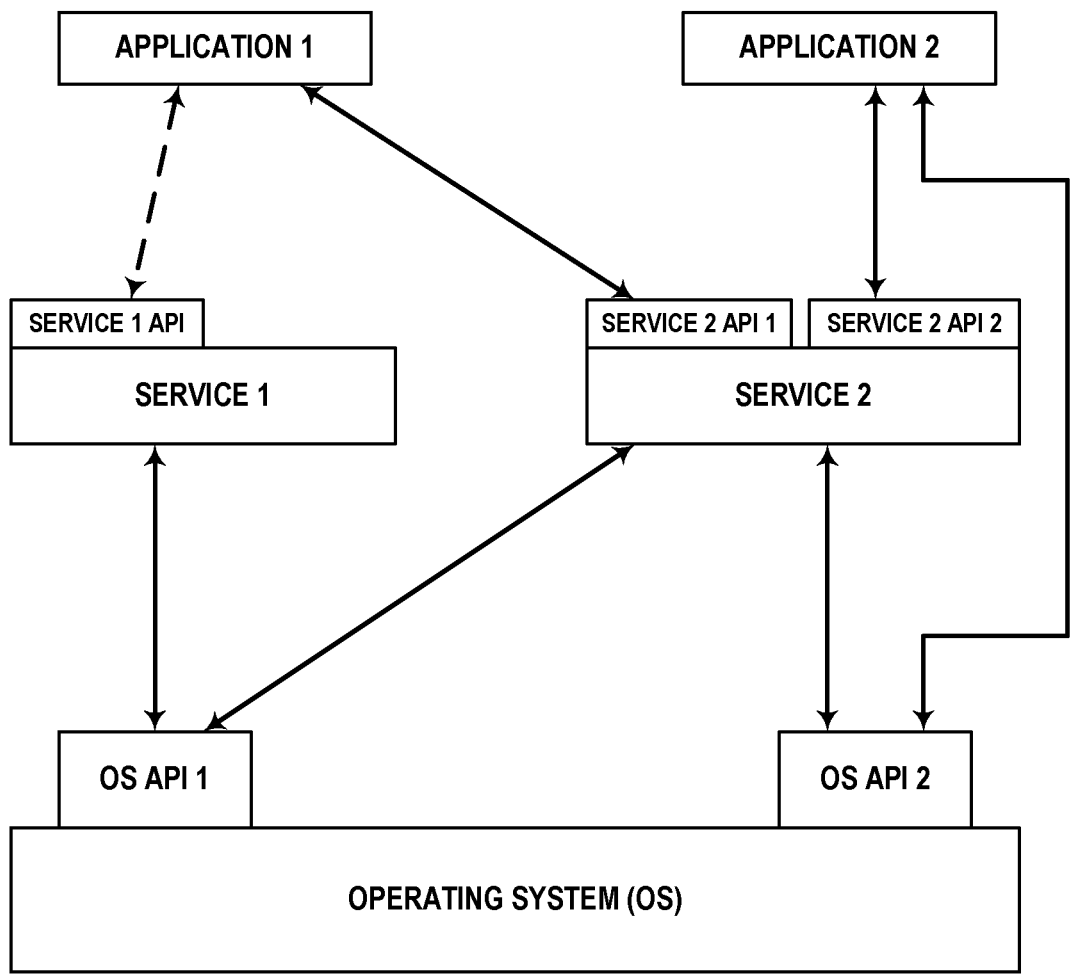
FIG. 9 illustrates an exemplary embodiment of a software stack usable in some embodiments of the invention.

In FIG. 9 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 10:
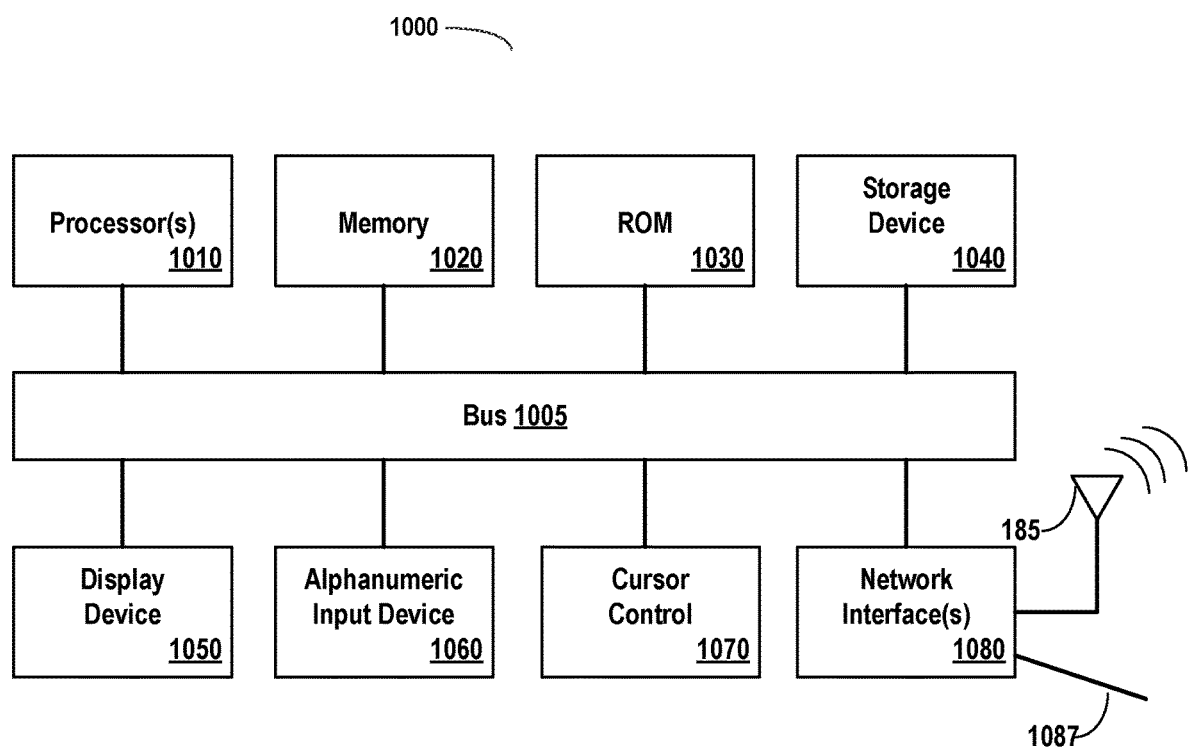
FIG. 10 is a block diagram of one embodiment of a computing system.

FIG. 10 is a block diagram of one embodiment of a computing system 1000. The computing system illustrated in FIG. 10 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 10 may be used to provide the computing device and/or the server device.

Computing system 1000 includes bus 1005 or other communication device to communicate information, and processor 1010 coupled to bus 1005 that may process information.

While computing system 1000 is illustrated with a single processor, computing system 1000 may include multiple processors and/or co-processors 1010. Computing system 1000 further may include random access memory (RAM) or other dynamic storage device (referred to as main memory 1020), coupled to bus 1005 and may store information and instructions that may be executed by processor(s) 1010. Main memory 1020 may also be used to store temporary variables or other intermediate information during execution of instructions by processor 1010.

Computing system 1000 may also include read only memory (ROM) and/or other static storage device 1040 coupled to bus 1005 that may store static information and instructions for processor(s) 1010. Data storage device 1040 may be coupled to bus 1005 to store information and instructions. Data storage device 1040 such as flash memory or a magnetic disk or optical disc and corresponding drive may be coupled to computing system 1000.

Computing system 1000 may also be coupled via bus 1005 to display device 1050, such as a cathode ray tube (CRT) or liquid crystal display (LCD), to display information to a user. Computing system 1000 can also include an alphanumeric input device 1060, including alphanumeric and other keys, which may be coupled to bus 1005 to communicate information and command selections to processor(s) 1010. Another type of user input device is cursor control 1070, such as a touchpad, a mouse, a trackball, or cursor direction keys to communicate direction information and command selections to processor(s) 1010 and to control cursor movement on display device 1050. Computing system 1000 may also receive user input from a remote device that is communicatively coupled to computing system 1000 via one or more network interface(s) 1080.

Computing system 1000 further may include one or more network interface(s) 1080 to provide access to a network, such as a local area network. Network interface(s) 1080 may include, for example, a wireless network interface having antenna 1085, which may represent one or more antenna(e). Computing system 1000 can include multiple wireless network interfaces such as a combination of Wi-Fi, Bluetooth® and cellular telephony interfaces. Network interface(s) 1080 may also include, for example, a wired network interface to communicate with remote devices via network cable 1087, which may be, for example, an Ethernet cable, a coaxial cable, a fiber optic cable, a serial cable, or a parallel cable.

In one embodiment, network interface(s) 1080 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 1080 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer implemented method executed on a term learning server, the method comprising:
   receiving, by a term learning server, a batch of differentially private sketches of n-grams, each n-gram a sequence of characters forming a subset of one term in a plurality of terms unknown to the term learning server, the batch of differentially private sketches received from one or more client devices;
   determining a randomization value based at least on the batch of differentially private sketches;
   determining a randomization tolerance based on a set of differentially private sketch data stored on the term learning server; and
   in response to determining that the randomization value differs from the randomization tolerance by greater than a threshold value, generating a privacy randomization warning to the term learning server, wherein the privacy randomization warning indicates to the term learning server to perform one or more operations to maintain privacy of the differentially private sketch data stored on the term learning server.

2. The computer implemented method as in claim 1, additionally comprising, in response to the privacy randomization warning, modifying a randomization algorithm on the term learning server.

3. The computer implemented method as in claim 1, additionally comprising, in response to the privacy randomization warning, purging at least a portion of the differentially private sketch data received from the one or more client devices.

4. The computer implemented method as in claim 3, additionally comprising periodically purging at least a portion of the differentially private sketch data received from the one or more client devices.

5. The computer implemented method as in claim 1, additionally comprising generating a privacy randomization warning to a user interface of the term learning server.

6. The computer implemented method as in claim 1, wherein determining a randomization value based at least on the batch of differentially private sketches includes:
for each sketch in the batch of differentially private sketches, determining a row XOR value, the row XOR value equal to an exclusive OR of each bit in a row of the sketch, and determining a sketch XOR value based on a sum of each row XOR value of a sketch; and
determine the randomization value based on an arithmetic mean of sketch XOR values for the batch of differentially private sketches.

7. A non-transitory machine readable medium storing instructions to cause one or more processors to perform operations comprising:
receiving, by a term learning server, a batch of differentially private sketches of n-grams, each n-gram a sequence of characters forming a subset of one term in a plurality of terms unknown to the term learning server, the batch of differentially private sketches received from one or more client devices;
determining a randomization value based at least on the batch of differentially private sketches;
determining a randomization tolerance based on a set of differentially private sketch data stored on the term learning server; and
in response to determining that the randomization value differs from the randomization tolerance by greater than a threshold value, generating a privacy randomization warning to the term learning server, wherein the privacy randomization warning indicates to the term learning server to perform one or more operations to maintain privacy of the differentially private sketch data stored on the term learning server.

8. The non-transitory machine readable medium as in claim 7, the operations additionally comprising, in response to the privacy randomization warning, modifying a randomization algorithm on the term learning server.

9. The non-transitory machine readable medium as in claim 7, the operations additionally comprising, in response to the privacy randomization warning, purging at least a portion of the differentially private sketch data received from the one or more client devices.

10. The non-transitory machine readable medium as in claim 9, the operations additionally comprising periodically purging at least a portion of the differentially private sketch data received from the one or more client devices.

11. The non-transitory machine readable medium as in claim 7, the operations additionally comprising generating a privacy randomization warning to a user interface of the term learning server.

12. The non-transitory machine readable medium as in claim 7, wherein determining a randomization value based at least on the batch of differentially private sketches includes:
for each sketch in the batch of differentially private sketches, determining a row XOR value, the row XOR value equal to an exclusive OR of each bit in a row of the sketch, and determining a sketch XOR value based on a sum of each row XOR value of a sketch; and
determine the randomization value based on an arithmetic mean of sketch XOR values for the batch of differentially private sketches.

13. A data processing system comprising:
a memory to store instructions:
one or more processors to execute instructions stored in memory, wherein the instructions cause the one or more processors to perform operations comprising:
receiving, by a term learning server, a batch of differentially private sketches of n-grams, each n-gram a sequence of characters forming a subset of one term in a plurality of terms unknown to the term learning server, the batch of differentially private sketches received from one or more client devices;
determining a randomization value based at least on the batch of differentially private sketches;
determining a randomization tolerance based on a set of differentially private sketch data stored on the term learning server; and
in response to determining that the randomization value differs from the randomization tolerance by greater than a threshold value, generating a privacy randomization warning to the term learning server, wherein the privacy randomization warning indicates to the term learning server to perform one or more operations to maintain privacy of the differentially private sketch data stored on the term learning server.

14. The data processing system as in claim 13, the operations additionally comprising, in response to the privacy randomization warning, modifying a randomization algorithm on the term learning server.

15. The data processing system as in claim 13, the operations additionally comprising, in response to the privacy randomization warning, purging at least a portion of the differentially private sketch data received from the one or more client devices.

16. The data processing system as in claim 15, the operations additionally comprising periodically purging at least a portion of the differentially private sketch data received from the one or more client devices.

17. The data processing system as in claim 13, the operations additionally comprising generating a privacy randomization warning to a user interface of the term learning server.

18. The data processing system as in claim 13, wherein determining a randomization value based at least on the batch of differentially private sketches includes:
for each sketch in the batch of differentially private sketches, determining a row XOR value, the row XOR value equal to an exclusive OR of each bit in a row of the sketch, and determining a sketch XOR value based on a sum of each row XOR value of a sketch; and
determine the randomization value based on an arithmetic mean of sketch XOR values for the batch of differentially private sketches.

\* \* \* \* \*